Figure 1:
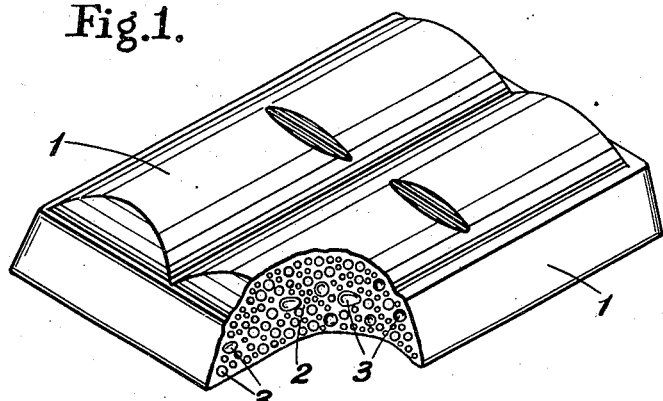

June 1, 1937.  J. W. TODD  2,082,313

PROCESS FOR MANUFACTURING ARTICLES OF FOOD OR CONFECTIONERY

Filed June 18, 1936

INVENTOR
JOHN W. TODD
By

Patented June 1, 1937

2,082,313

UNITED STATES PATENT OFFICE 2,082,313

PROCESS FOR MANUFACTURING ARTICLES OF FOOD OR CONFECTIONERY

John William Todd, East London, Union of South Africa

Application June 18, 1936, Serial No. 86,002
In Great Britain July 11, 1935

4 Claims. (Cl. 99—138)

This invention relates to a process for manufacturing articles of food or confectionery which, at temperatures up to about 80° F. or 26° C., possess throughout or in part a cellular structure or honeycombed formation readily visible to the eye and the cellular portions of which are solidified and are formed from a food or confectionery substance consisting of an edible fatty medium, which is fluid, liquid, semi-liquid, plastic, or molten, at temperatures exceeding about 90° F. or 32° C., and tends to become more rigid at temperatures below said temperature, for instance, cocoa-butter, and which may contain one or more edible ingredients, such as, for example, sugar, cocoa, milk, biscuit, nuts, raisins and other fruit, or fondant cream. The materials, that is the edible fatty medium with its ingredients, may have been ground together to form a homogeneous paste at temperatures exceeding about 90° F. or 32° C. On the other hand the edible fatty medium may contain one or more edible ingredients which remain whole, or in fractions or portions of comparatively considerable magnitude. For instance, biscuit, nuts and raisins may remain in this form. The edible fatty medium may however contain one or more ingredients which have been ground with it and in addition one or more ingredients which have been added whole or in fractions or portions of comparatively considerable magnitude and which remain in this form. The individual cells or cavities are filled with gas at sub-atmospheric, atmospheric, or super-atmospheric pressure.

The term "cellular structure" is in this specification to be understood to mean a honeycombed structure or formation comprising an exceedingly large number of separate closed cavities, the vast majority of which are more or less spherical, globular or ellipsoidal in shape, or are of an irregular (for instance, polygonal) shape in cross-section, and the dimensions of which in any three directions at right angles to one another are in the vast majority of cases substantially of the same order of magnitude (in contradistinction to the elongated cavities of stratified material or to the tubular cavities referred to above). Any two cross-sections, at right angles to one another, of material possessing this cellular structure will present somewhat similar honeycombed appearances. The more the fatty medium contains permanently solid ingredients of irregular shapes and of a size more or less comparable to the size of the cavities the more irregular will the shapes of the cavities tend to be. The cavities are readily visible to the eye and the majority of the cavities may vary from a quarter of a millimetre to three millimetres in length or width. The average distance between the cavities may be as much as three or four times the average width of the cavities, but preferably their distance apart is much less than their width. The cavities may be of substantially uniform size.

The material constituting the whole article or those portions of it which possess a cellular structure is thus a dispersion, readily visible to the eye, of gas, at sub-atmospheric, atmospheric, or super-atmospheric pressure, in a solid edible medium or matrix, the gas being the disperse phase and in the form of globules or bubbles, and the edible fatty medium, with or without one or more edible ingredients, the continuous phase. This dispersion will hereinafter be termed a "gas-filled globular solidified dispersion", and it will be understood that the portions having a cellular structure, or in other words the cellular portions, are portions consisting of gas-filled globular solidified dispersions as defined above.

The articles in question are defined and described in the specification of my co-pending patent application No. 86,001 filed June 18, 1936.

A few of the articles are illustrated, merely by way of example, in the accompanying drawing, in which:—

Figure 2:
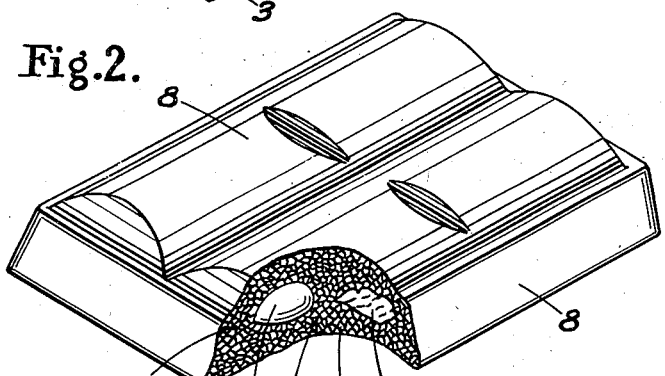
Figure 3:
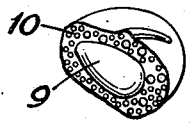

Fig. 1 is a perspective view of a tablet of chocolate, one corner being broken off, Fig. 2 a perspective view of a tablet of chocolate containing nuts and raisins, one corner being broken off, Fig. 3 a perspective view of the broken off half of an article of confectionery having a central nut and an outer layer of cellular chocolate.

Figure 4:
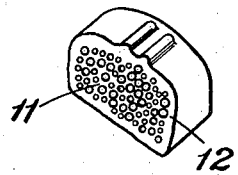

Fig. 4 a perspective view of the broken off half of an article of confectionery having a central cellular portion of chocolate and an outer non-cellular layer of sugar icing.

Figure 6:
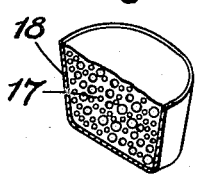
Figure 5:
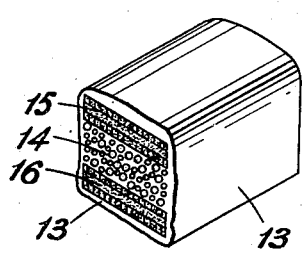

Fig. 5 a perspective view of the broken off end of a sandwich containing within an outer lining of chocolate a layer of cellular chocolate between two layers of biscuit, and Fig. 6 a perspective view of the broken off half of an article of confectionery consisting of a body of cellular chocolate in combination with an external covering of foil adhering to said cellular chocolate.

Referring to Fig. 1, the tablet consisits of an outer covering or lining 1 of non-cellular chocolate enclosing an internal mass of cellular chocolate 2, the individual cavities, 3, 3, of which are at a comparatively large distance apart and are mostly more or less spherical in shape.

The tablet shown in Fig. 2 consists of a mass of cellular chocolate 4 containing raisins and nuts, one raisin 5 being shown and one nut 6. The individual cavities 7, 7, are much closer together than the cavities 3, 3, of the tablet shown in Fig. 1, so that in general the cavities are polygonal in cross-section. Cavity walls constitute the external superficial portion 8 of the tablet, no separate lining of non-cellular chocolate having been provided in the course of manufacture.

In Fig. 3, 9 is a nut and 10 an outer layer of cellular chocolate.

In Fig. 4, 11 is a centre of cellular chocolate and 12 an outer layer of sugar icing.

In Fig. 5, 13 is the outer lining of non-cellular chocolate, and 14 a layer of cellular chocolate sandwiched between two layers 15, 16 of biscuit.

In Fig. 6, the body 17 of cellular chocolate is combined with an external covering 18 of foil which adheres to said cellular chocolate.

When one of the articles in question is eaten the cellular structure of the whole article or of part of the article makes the article easier to bite, through giving crispness to the article and through making it softer, that is, structurally weaker, and the cellular structure also makes the article more rapidly soluble in the mouth.

The process according to the present invention consists in distributing or dispersing or producing in the edible fatty medium, or in the same mixed with edible ingredients, while the medium is in a fluid or like state, a very large number of separate but closely associated bubbles of air or other gas, of a magnitude readily visible to the eye, which imparts to the medium a cellular structure, and in cooling the medium either artificially or naturally while in its cellular condition in order that it may set and solidify in this condition and not collapse back into its original deflated state.

The process may be carried out by taking as a starting material an edible fatty medium which is in a fluid or like state, and which may contain one or more edible ingredients and which already contains distributed or dispersed in itself a very large number of separate but closely associated bubbles of air or other gas, which are mostly invisible to the eye, and by producing the cellular structure readily visible to the eye by reducing the pressure on the medium to a pressure below atmospheric pressure.

In some cases in which it is desired to produce articles integral parts of which are cellular and integral parts of which are non-cellular, the material for forming the non-cellular parts may be added to or mixed with the aerated material for forming the cellular parts and the aerated material be treated as above set forth, while mixed with the other material in a fluid, liquid, semi-liquid, or molten condition, which may finally become solid. It is possible accurately to control the relative proportions of the cellular portions and the non-cellular portions.

The method used does not require the elimination of any moisture or other substance which may be volatile under the conditions described in the method of manufacture.

One method of carrying out the process according to the present invention consists in introducing air or gas in the form of innumerable minute bubbles, into the substance while in a molten condition, for example by means of a whisk, centrifuge, or other known means of aeration, under atmospheric pressure, and in reducing the external pressure on the substance, so as to cause said bubbles to expand to a size easily visible to the eye, thus imparting to the substance a cellular formation. The size of the expanded bubbles and the nature of the cellular structure may be varied by varying the external pressure, or by varying the consistency of the substance, or by varying the temperature of the substance, or that of the material of the mould or holder which carries the molten substance. In order that the cellular formation may remain permanent at ordinary atmospheric temperatures up to about 26° C., it is necessary to chill or set the material or to allow it to cool, while still maintaining an external pressure less than atmospheric pressure.

One example, with variations, of this method will now be described with particular reference to a substance consisting of cocoa, sugar, milk, and cocoa-butter, such as is used for the manufacture of milk chocolate. This substance is taken simply as an example of a substance consisting of a fatty medium containing a number of ingredients.

The chocolate is warmed and well mixed until it takes a liquid or semi-liquid form. It is then thoroughly aerated by being passed through a whisk, or centrifuge, or other known means of aeration. After the material has been treated in this way, it is tempered in any of the ways commonly known in the chocolate industry and then deposited either by hand or mechanically into moulds, in any of the ways commonly known. If desired, nuts and raisins, or other solid ingredients may be mixed into the chocolate before or after the tempering operation. The chocolate may be deposited into moulds which have been lined with chocolate by any method known in the chocolate industry. Alternatively the mould may be lined with any other edible product, or with layers of chocolate and layers of other edible material, or with mixtures of chocolate and other edible material, or with a non-edible material such as foil, card, or paper. The external pressure on the chocolate is now reduced, say to a pressure of two inches of mercury. This may be effected by providing each mould with a cover plate and exhausting the interior of the mould, or by placing the moulds in a vacuum chamber and applying to the chamber the necessary degree of vacuum. On the external pressure being reduced the bubbles of air inside the chocolate expand to a size readily visible to the eye and distend the chocolate and produce a cellular formation. Some of the bubbles may coalesce. The reduced external pressure is maintained until the chocolate has become inflated or distended and has set or solidified sufficiently to retain its cellular formation at atmospheric pressure. Preferably during this period the moulds or the vacuum chamber are subjected to a cooling operation, by means of natural air or by means of a cold air blast, or by direct or indirect contact with a cold liquid. The chocolate may be either completely solidified whilst under the influence of the vacuum, or it may be solidified just sufficiently to retain the cellular construction when the external pressure rises to the atmospheric pressure. The final stages of solidification may then taken place under atmospheric pressure. These final stages of solidification may be accomplished by passing the moulds through an ordinary cooling chamber or by any of the known methods in the chocolate industry. The cakes of material are then knocked out from the moulds in the standard way as employed for chocolate moulding. It will be understood of course that when solid pieces, such as nuts and raisins have been introduced just before or after the tempering operation, such pieces do not become cellular in structure, but remain solidly compact.

In those cases in which the moulds containing the cellular chocolate are lined with chocolate or other edible material, the cellular chocolate, before the cakes are knocked out of the moulds, may be covered with layers of non-cellular chocolate and the cakes not be knocked out of the moulds until after the said non-cellular chocolate has cooled.

The moulds may be of metal or of any material normally used in the chocolate industry. Alternatively, the moulds may be of some edible material, such as confectionery or biscuit, so that a combined product is made comprising cellular chocolate. Or cellular chocolate may be sandwiched with non-cellular chocolate or with some other edible product.

Articles made by the process according to the present invention (whether of chocolate or of other material) may be readily produced in the form of tablets of any required weight and shape, whether the whole article be cellular or whether the interior be cellular and the external portion be non-cellular. Moreover the material for forming the cellular portions may be treated while possessing very various degrees of consistency according to the desired nature of the article to be produced. Thus in some cases the said material may be comparatively liquid and behave like a liquid and in some cases possess a fairly stiff consistency and behave like a stiff paste capable of retaining a given shape for a comparatively long time even before it has solidified.

In the manufacture of chocolate there is usually sufficient air introduced, mostly in a form invisible to the eye, to enable the chocolate in a liquid or semi-liquid form to be taken as the starting material so that in the manufacture, according to the present invention, of chocolate articles it is usually unnecessary to perform a separate aerating operation by passing the material through a whisk, or centrifuge, or other known means of aeration.

Another method of carrying out the process according to the present invention comprises aeration by means of a whisk, centrifuge, or other known means of aeration, at pressures greater than atmospheric pressure, and expanding the bubbles by reducing the super-atmospheric pressure to any desired extent, and chilling or setting, the material. Instead of using a whisk, centrifuge, or other known means of aeration, one or more admixtures capable of generating bubbles of gas within the substance may be employed.

What I claim is:—

1. The method of treating an essentially fatty non-extensible confection composition which as an entirety has a melting temperature in the neighborhood of 90° F. which consists in subjecting the composition to a temperature above its melting temperature to render it fluid, introducing into and distributing under pressure throughout the composition while in its fluid state, parts of an agent selected from the class consisting of an expansible gas and expansible gas forming substances, lowering the external pressure, while the composition is still fluid, to cause the parts of said agent to expand without breaking through the surface of the fluid composition and to impart thereto a puffed cellular form, and subsequently maintaining the lowered pressure on the composition, while subjecting the same to a temperature below its melting temperature to cause it to set in its puffed cellular form.

2. The method of treating an essentially fatty non-extensible chocolate composition which as an entirety has a melting temperature in the neighborhood of 90° F. which consists in subjecting the composition to a temperature above its melting temperature to render it fluid, introducing into and distributing under pressure throughout the composition while in its fluid state, parts of an agent selected from the class consisting of an expansible gas and expansible gas forming substances, lowering the external pressure, while the composition is still fluid, to cause the parts of said agent to expand without breaking through the surface of the fluid composition and to impart thereto a puffed cellular form, and subsequently maintaining the lowered pressure on the composition, while subjecting the same to a temperature below its melting temperature to cause it to set in its puffed cellular form.

3. The method of treating an essentially fatty non-extensible confection composition which as an entirety has a melting temperature in the neighborhood of 90° F. which consists in subjecting the composition to a temperature above its melting temperature to render it fluid, introducing into and distributing under pressure throughout the composition while in its fluid state parts of air, then lowering the external pressure, while the composition is still fluid, to cause the parts of said air to expand without breaking through the surface of the fluid composition and to impart thereto a puffed cellular form, and subsequently maintaining the lowered pressure on the composition, while subjecting the same to a temperature below its melting temperature to cause it to set in its puffed cellular form.

4. The method of treating an essentially fatty non-extensible confection which as an entirety has a melting temperature in the neighborhood of 90° F. which consists in subjecting the composition to a temperature above its melting temperature to render it fluid, introducing into and distributing under pressure throughout the composition while in its fluid state parts of a gas forming substance, then lowering the external pressure, while the composition is still fluid, to cause the parts of said substance to expand without breaking through the surface of the fluid composition and to impart thereto a puffed cellular form, and subsequently maintaining the lowered pressure on the composition, while subjecting the same to a temperature below its melting temperature to cause it to set in its puffed cellular form.

JOHN WILLIAM TODD.